(12) United States Patent
Quintus et al.

(10) Patent No.: US 7,887,445 B2
(45) Date of Patent: Feb. 15, 2011

(54) BELT TENSIONER

(75) Inventors: James G. Quintus, Greene County, MO (US); Edward A. Rammel, Bixby, OK (US)

(73) Assignee: Dayco Products, LLC, Tulsa, OK (US)

( * ) Notice: Subject to any disclaimer, the term of this patent is extended or adjusted under 35 U.S.C. 154(b) by 1313 days.

(21) Appl. No.: 11/040,283

(22) Filed: Jan. 20, 2005

(65) Prior Publication Data

US 2006/0172837 A1 Aug. 3, 2006

(51) Int. Cl.
*F16H 7/12* (2006.01)
*F16H 7/10* (2006.01)

(52) U.S. Cl. .................. 474/135; 474/112; 474/109; 474/133

(58) Field of Classification Search .......... 474/135, 474/112, 109, 133
See application file for complete search history.

(56) References Cited

U.S. PATENT DOCUMENTS

| | | | |
|---|---|---|---|
| 4,351,636 A | | 9/1982 | Hager |
| 4,473,362 A | | 9/1984 | Thomey et al. |
| 4,698,049 A | * | 10/1987 | Bytzek et al. ............. 474/135 |
| 4,917,655 A | * | 4/1990 | Martin .................... 474/112 |
| 5,011,460 A | * | 4/1991 | Ouchi et al. .............. 474/133 |
| 5,967,919 A | * | 10/1999 | Bakker .................... 474/94 |
| 6,004,235 A | * | 12/1999 | Ohta et al. ................ 474/109 |
| 6,206,797 B1 | | 3/2001 | Quintus |
| 6,264,578 B1 | * | 7/2001 | Ayukawa .................. 474/135 |
| 6,422,963 B2 | * | 7/2002 | Kurose .................... 474/101 |
| 6,682,452 B2 | | 1/2004 | Quintus |
| 2002/0119850 A1 | * | 8/2002 | Dutil ...................... 474/135 |

FOREIGN PATENT DOCUMENTS

| | | |
|---|---|---|
| CN | 1502023 | 6/2004 |
| GB | 2230319 | 10/1990 |
| WO | 02/068841 | 9/2002 |

OTHER PUBLICATIONS

CN, First Office Action, Chinese Application No. 200680002766.7, 8 pages (Oct. 10, 2008).
CN, Second Office Action, Chinese Application No. 200680002766.7, 2 pages (Nov. 6, 2009).
EP, Communication regarding Intention to Grant, European Application No. 06718706.2, 7 pages (Jun. 13, 2008).
EP, Supplementary European Search Report, European Application No. 06718706.2, 6 pages (Jan. 23, 2008).

(Continued)

*Primary Examiner*—Bradley T King
*Assistant Examiner*—Mahbubur Rashid
(74) *Attorney, Agent, or Firm*—Thompson Hine LLP

(57) ABSTRACT

A tensioner for tensioning a belt includes a support housing that defines, at least in part, a spring cavity and an arm pivotably attached to the support housing. A spring is disposed in the spring cavity and is operatively connected to the arm and support housing to bias the arm to pivot relative to the support housing. The spring is a round wire coil spring having an unloaded axial height and wherein the spring cavity has a height greater than the unloaded axial height of the spring.

36 Claims, 5 Drawing Sheets

OTHER PUBLICATIONS

PCT, International Preliminary Report on Patentability, International Application No. PCT/US2006/001670, 3 pages (Oct. 1, 2007).

PCT, International Search Report, International Application No. PCT/US2006/001670, 3 pages (mailed Mar. 28, 2007; published Jun. 7, 2007).

PCT, Written Opinion, International Application No. PCT/US2006/001670, 3 pages (Mar. 28, 2007).

CN, Third Office Action, Chinese Application No. 200680002766.7, 7 pages. (Oct. 12, 2010).

AU, Examiners First Report, Application No. 2006206578, 2 pages. (Nov. 4, 2010).

* cited by examiner

BELT TENSIONER

TECHNICAL FIELD

The present application relates generally to belt tensioners and more particularly to a belt tensioner with a round wire spring.

BACKGROUND

A tensioner is frequently utilized in a belt system to tension an endless belt that transmits power to accessories in an automobile engine. Tensioners typically use a spring, such as a flat wire or round wire spring to bias a pivot arm toward the belt. In tensioners employing a round wire spring, the round wire spring is compressed axially during assembly and is used to apply an axial force to the pivot arm. This axial spring force is used to maintain pivot arm alignment during use.

SUMMARY

In one aspect, a tensioner for tensioning a belt includes a support housing that defines, at least in part, a spring cavity and an arm pivotably attached to the support housing. A spring is disposed in the spring cavity and is operatively connected to the arm and support housing to bias the arm to pivot relative to the support housing. The spring is a round wire coil spring having an unloaded axial height and wherein the spring cavity has a height greater than the unloaded axial height of the spring.

In another aspect, a tensioner for tensioning a belt includes a support housing, an arm pivotably attached to the support housing and a compression member configured to bias the arm and the support housing together with an axial force. A round wire spring is operatively connected to the support housing and the arm to bias the arm to pivot relative to the support housing. The round wire spring is disposed within the support housing such that the axial force exerted by the compression member is not exerted on the spring.

In still another aspect, a method of assembling a belt tensioner comprising a support housing and an arm pivotably attached to the support housing is provided. The method includes coupling the support housing and the arm together through a round wire spring so as to bias the arm to pivot relative to the support housing, biasing the arm and support member together using a compression member and locating the round wire spring within the support member. According to this aspect, the round wire spring is isolated from the compressive force exerted by the compression member.

The details of one or more embodiments are set forth in the accompanying drawings and the description below. Other features, objects, and advantages will be apparent from the description and drawings, and from the claims.

BRIEF DESCRIPTION OF THE DRAWINGS

FIG. 1A is a side view of an unloaded round wire spring of the belt tensioner of FIG. 1;

DETAILED DESCRIPTION

Figure 1:
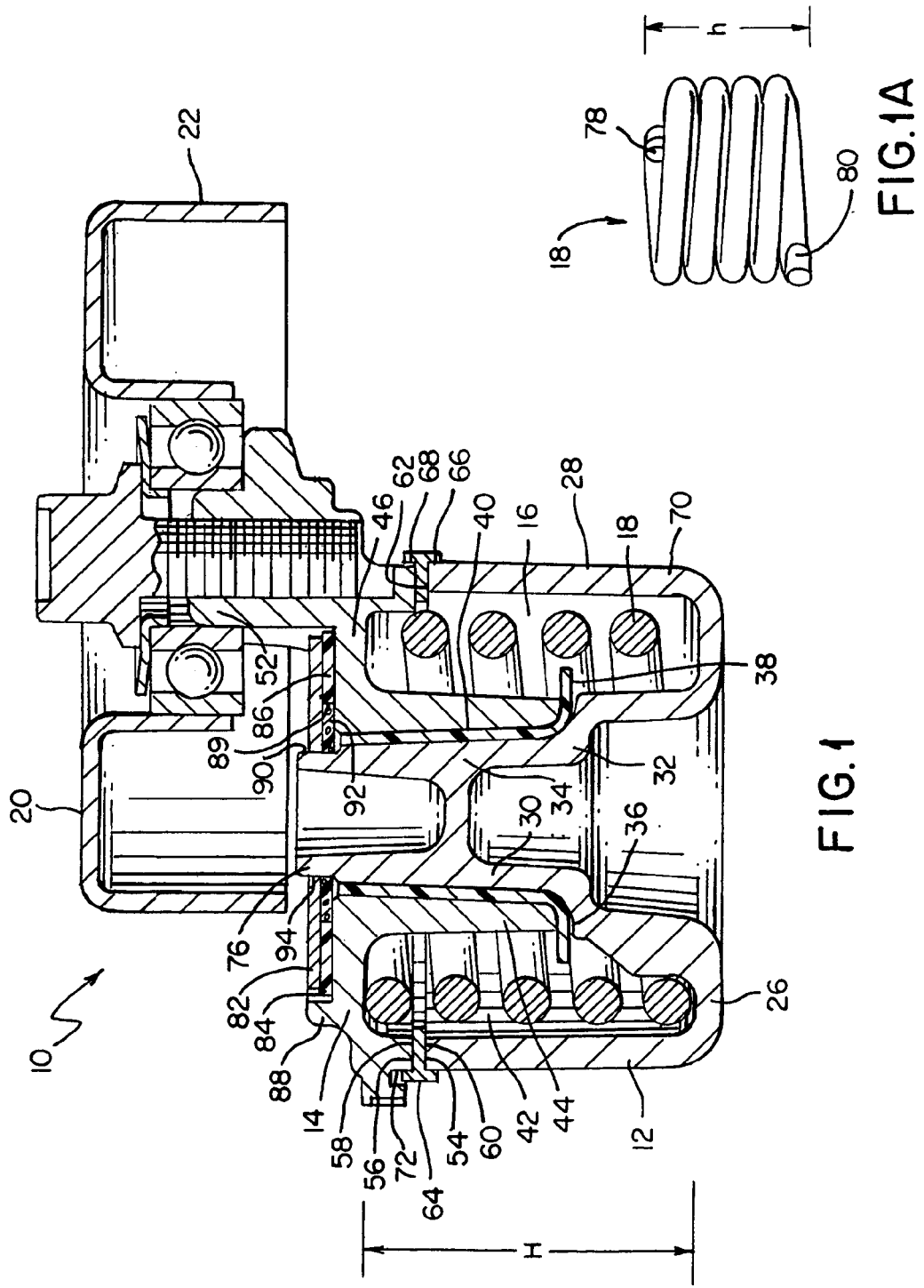
FIG. 1 is a section view of a belt tensioner according to one embodiment.
Figure 6:
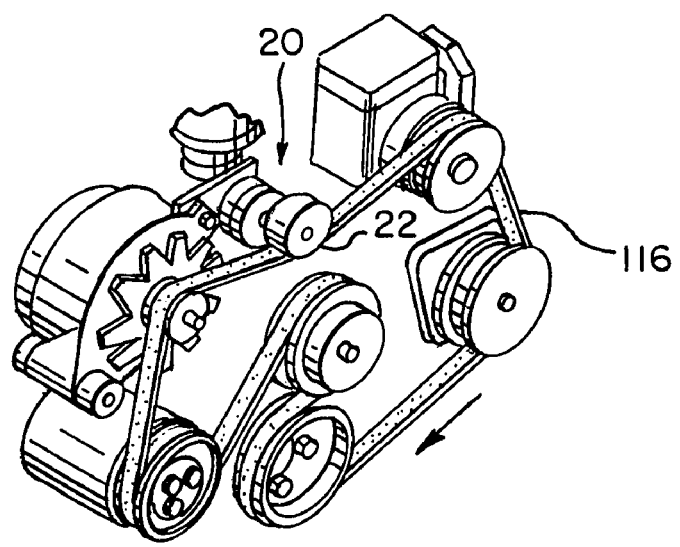
FIG. 6 is a schematic view of the belt tensioner of FIG. 1 engaging an automotive transmission belt.

Referring to FIG. 1, a belt tensioner 10 includes a support housing 12 and a pivot arm 14 rotatably mounted to the support housing to form a spring cavity 16 therebetween. Located within the spring cavity 16 and operatively connected to both the pivot arm 14 and the support housing 12 is a round wire, helical spring 18. The round wire spring 18 applies a force to the pivot arm 14 during use to bias the pivot arm toward an unloaded position. The pivot arm 14 carries a pulley 20, such as a front or backside idler pulley, that can rotate relative to the pivot arm. The pulley 20 has a belt-engaging surface 22 for engaging a belt 116, such as an automotive transmission belt (FIG. 6). As will be described in greater detail below, the spring cavity 16 has a height H that is greater than an unloaded height h of the round wire spring 18 (FIG. 1A) effectively isolating the round wire spring from axial compression forces applied, for example, to maintain pivot arm alignment and to provide friction damping.

Figure 2:
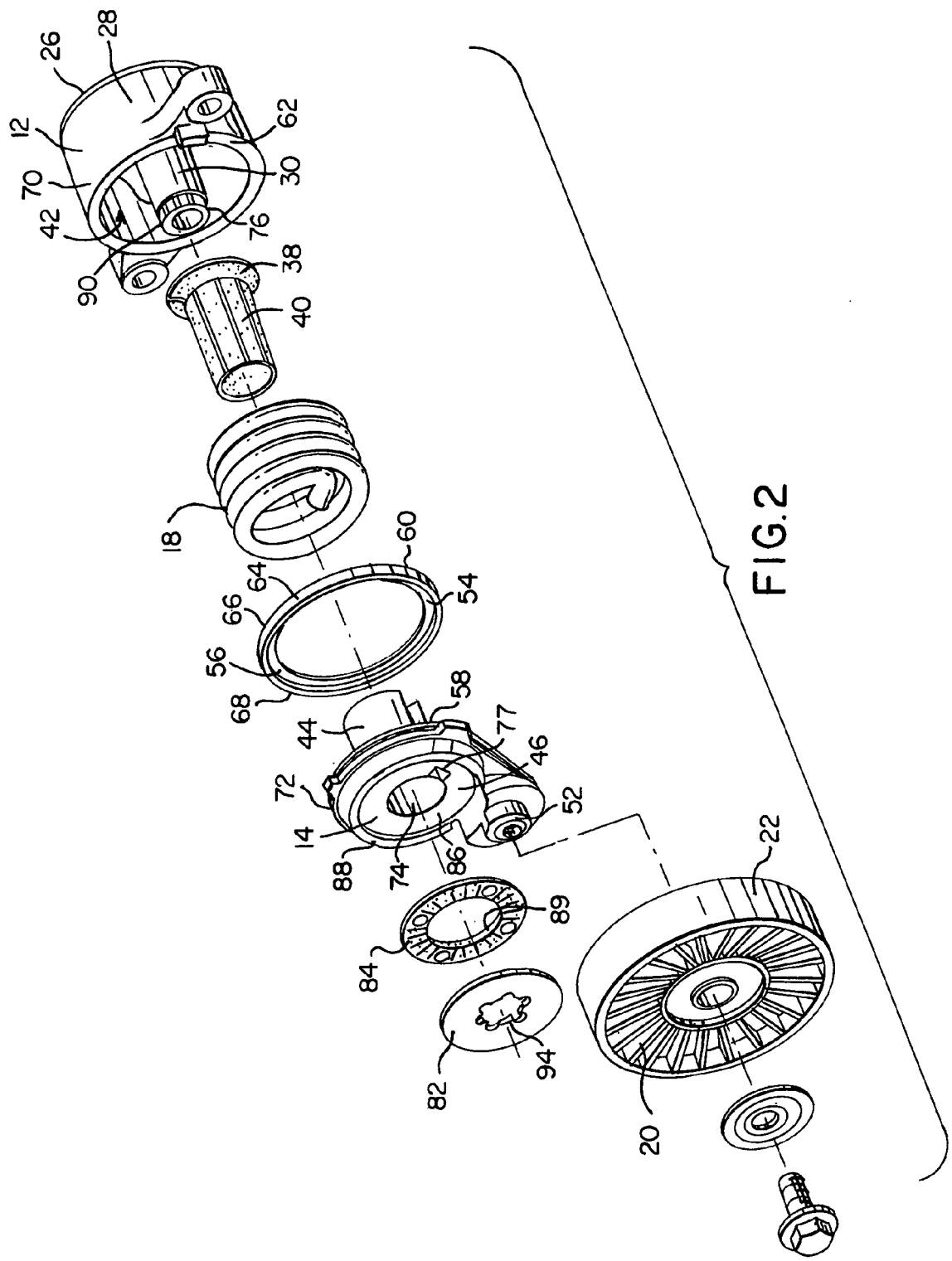
FIG. 2 is an exploded view of the belt tensioner of FIG. 1.

Referring also to FIG. 2, the support housing 12 includes a base 26, an outer wall 28 and an alignment member 30 extending upwardly from the base and centrally located within a recess 42 formed by the outer wall and the base. The alignment member 30 has an enlarged proximal portion 32, a relatively narrower distal portion 34 and a transition therebetween (FIG. 1) forming a seating surface 36 that is shaped to receive a base portion 38 of a pivot bushing 40 (e.g., formed of molded plastic).

The pivot arm 14 includes a sleeve 44 sized to receive both the pivot bushing 40 and the alignment member 30, an upper wall 46 extending outwardly from the sleeve, an opening 74 sized to receive an end 76 of the alignment member 30 and a pulley support 52 connected to the upper wall at a location offset from the opening 74. Each of the pivot arm 14 and support housing 12 can be formed of any suitable material, including metal or polymer and can be formed by any suitable method, such as casting, machining and/or molding.

Positioned between the pivot arm 14 and the support housing 12 is a spring bushing 54 (e.g., formed of molded plastic). Spring bushing 54 has an upper surface 56 that can be placed in continuous (i.e., unbroken) annular contact with a lower edge 58 of the pivot arm 14 and a lower surface 60 that that can be placed in continuous annular contact with an upper edge 62 of the support housing 12. This continuous annular contact can maximize surface area contact between the spring bushing—pivot arm—support housing assembly, which can provide increased friction damping of the pivot arm during use. Alternatively, in other embodiments, contact between the upper surface 56 and lower edge 58 and/or contact between lower surface 60 and upper edge 62 may not be continuous.

A flange 64 extends about a periphery of the spring bushing 54. The flange 64 has inner surfaces 66 and 68 configured to extend over an outer surface 70 of the support housing 12 and an outer surface 72 of the pivot arm 14, respectively, e.g., to provide a labyrinth-type seal between the pivot arm and the support housing. This seal can inhibit passage of foreign agents, e.g., dirt, oil, etc. into the spring cavity, which can affect the tensioner's operation. In some embodiments, the spring bushing may not include a flange or the flange may extend over only one of the outer surfaces 70 or 72.

Figure 3:
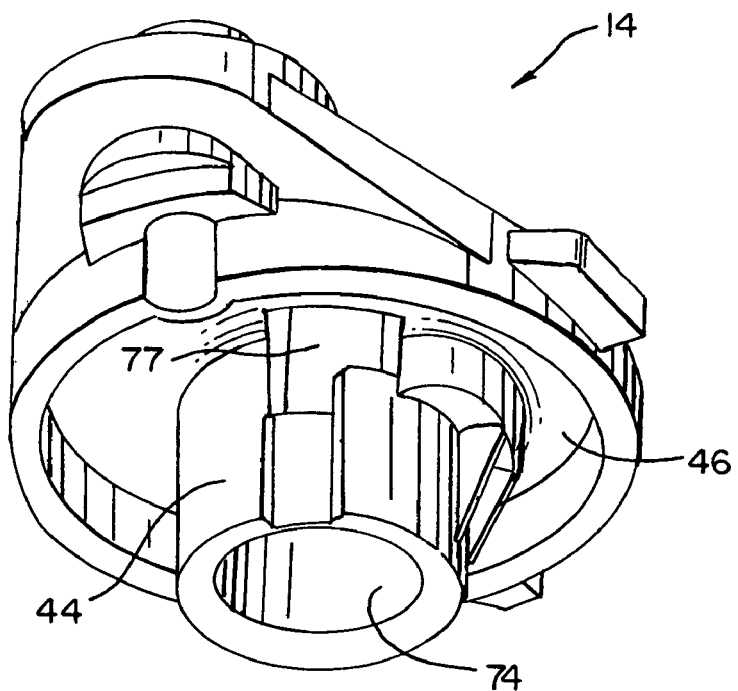
FIG. 3 is a perspective view of a pivot arm of the belt tensioner of FIG. 1.
Figure 4:
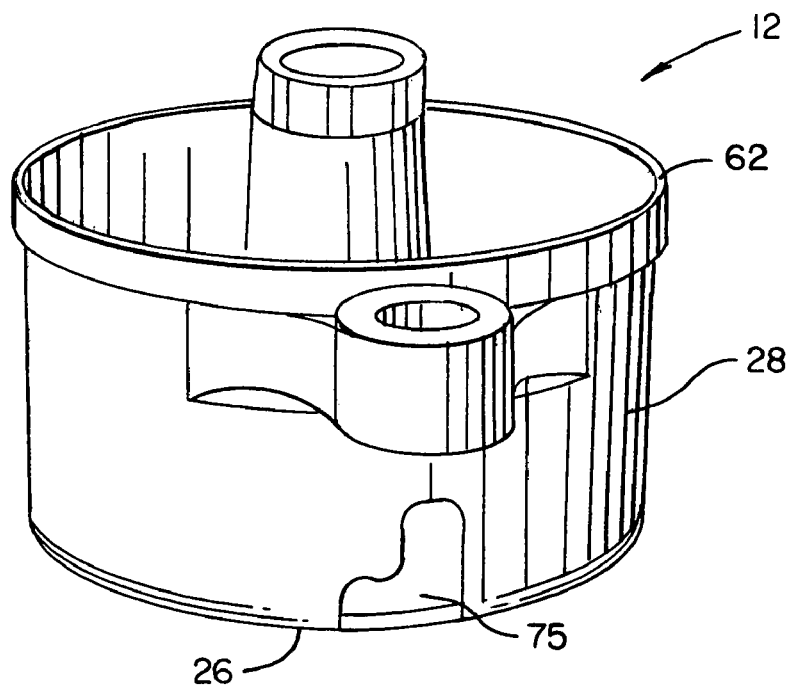
FIG. 4 is a perspective view of a support housing of the belt tensioner of FIG. 1.

As noted above, round wire spring 18 biases the pivot arm 14 toward an unloaded position during use. Referring to FIGS. 3 and 4, to operatively connect the round wire spring 18 to each of the support housing 12 and the pivot arm 14, slots 75 and 77 are provided. As shown, the slots 75 and 77 are L-shaped, however, any suitable shape can be used. Referring to FIGS. 1A and 3, the pivot arm 14 includes slot 77 that is sized to receive an inwardly facing end 78 of round wire spring 18. In the illustrated embodiment, slot 77 extends only partially into sleeve 44 and through upper wall 46 at a location adjacent opening 74 (FIG. 2). Referring now to FIGS. 1A and 4, the support housing 12 includes slot 75 extending through outer wall 28 that is sized to receive an outwardly facing end 80 of round wire spring 18. The slot 75 is located near base 26 at a location spaced-apart from the upper edge 62 of the support housing 12. In some cases, slot 75 extends only partially through outer wall 28.

Figure 5A:
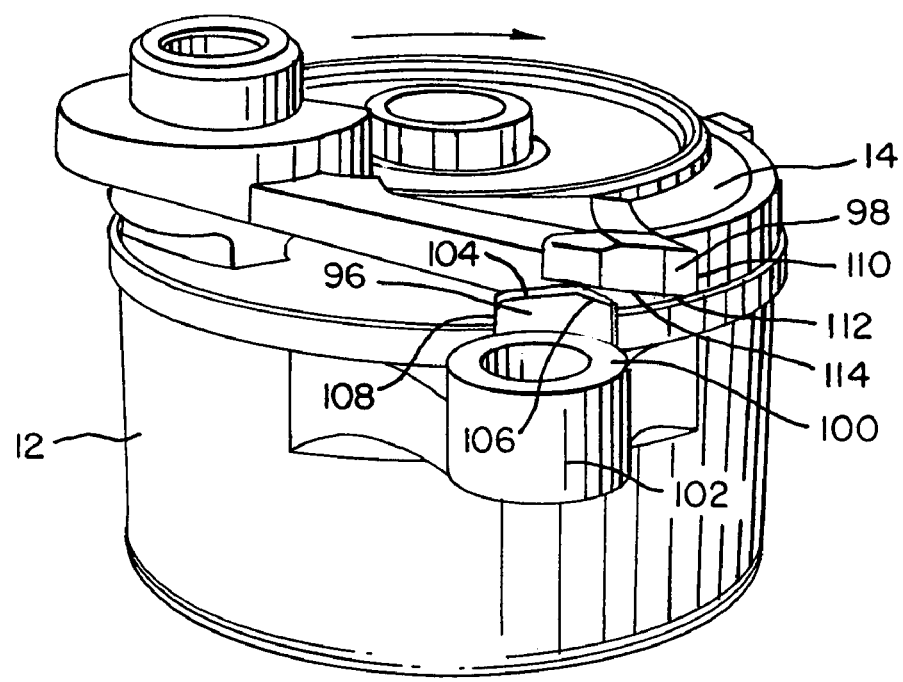
FIGS. 5A-5C are perspective views of the belt tensioner of FIG. 1 with the pulley removed.
Figure 5B:
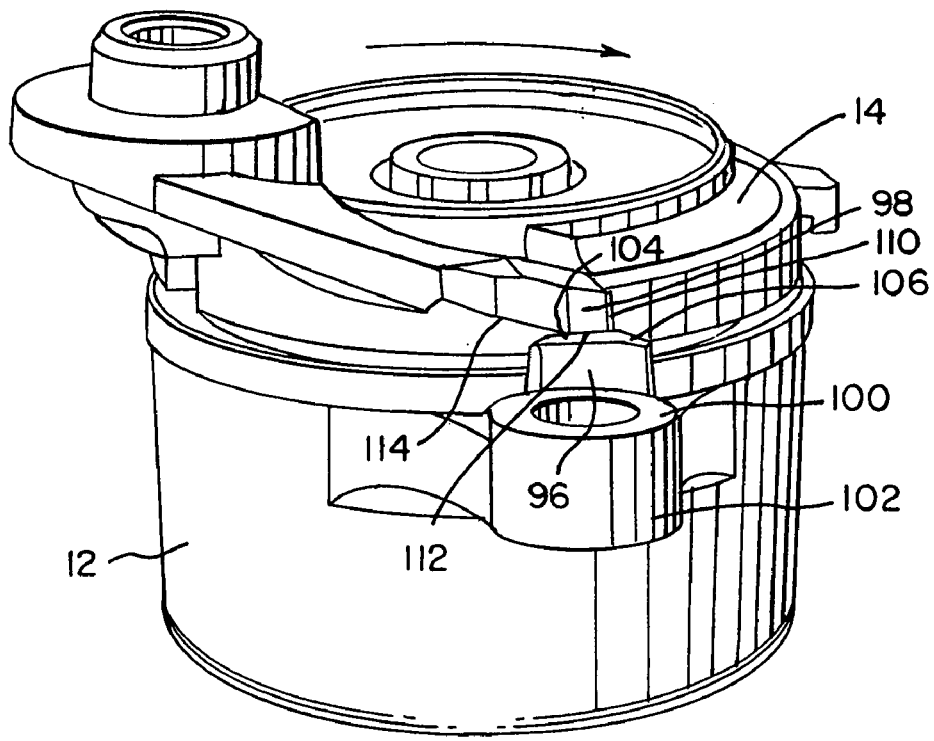
Figure 5C:
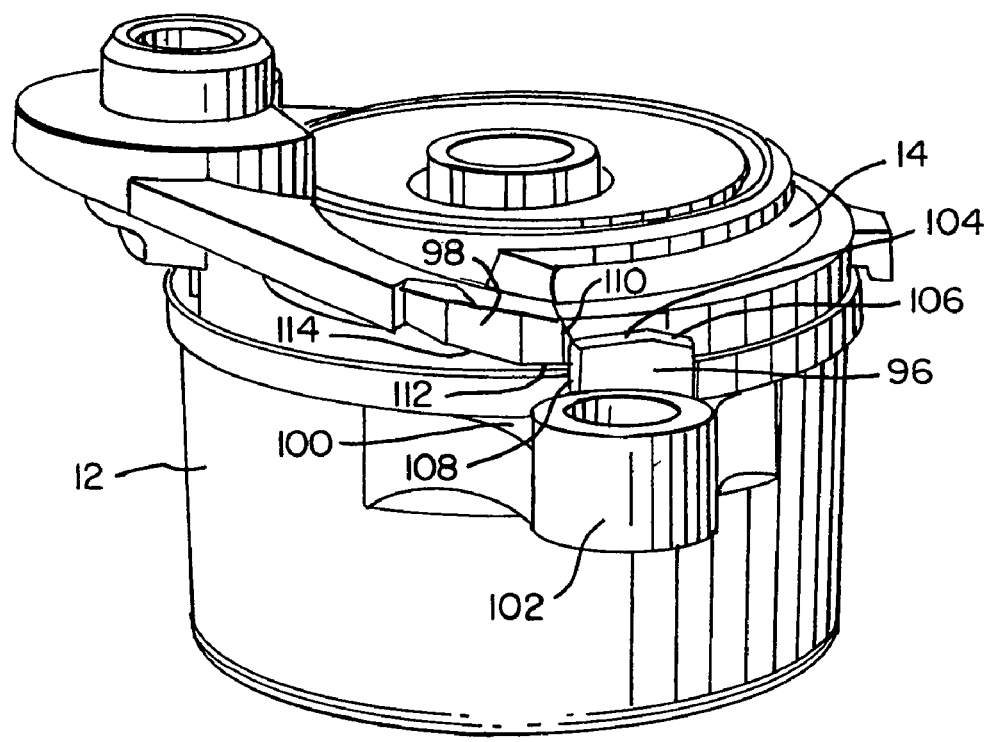

With the spring operatively connected to the pivot arm 14 and the support housing 12, biasing force can be applied to the pivot arm merely by rotating one of the pivot arm and support housing relative to the other. Referring to FIGS. 5A-5C, the support housing 12 and the pivot arm 14 each include cooperating stops 96 and 98, respectively. Stop 96 extends upwardly from an upper surface 100 of support mount 102 and includes a relatively flat surface region 104, a relatively angled surface region 106 and a stop surface 108 capable of engaging a stop surface 110 of stop 98. Stop 98 also includes a relatively flat surface region 112 and a relatively angled surface region 114. Referring particularly to FIGS. 5A and 5B, the angled surface regions 106 and 114 of the stops 96 and 98 cooperate to allow stop 98 to slide along the flat surface region 104 of stop 96 during rotation. Referring particularly to FIG. 5C, once stop surface 110 of stop 98 passes stop surface 108 of stop 96, the stop surfaces engage to inhibit counter-rotation due to the biasing force, thus placing the pivot arm 14 in the unloaded position.

Referring back to FIGS. 1 and 2, the assembly is clamped or compressed together by an axial compression force using an armplate 82 (e.g., formed of spring steel) and plate bushing 84 (e.g., formed of plastic). The plate bushing 84 is sized to fit within a seating portion 86 of the pivot arm 14. A raised rim 88 extends about the seating portion 86 to align the plate bushing once seated within the seating portion. As can be seen, the plate bushing 84 has an inner surface 88 that is spaced-apart from an outer surface 90 of the alignment member 30 forming a gap 92 therebetween. Referring particularly to FIG. 1, during radially riveting the armplate 82 to the alignment member 30, inner edge 94 of the armplate is elastically deflected into gap 92 formed between inner surface 89 and outer surface 90. This elastic deflection biases the assembly together thereby affecting sliding friction between the rotational and stationary parts of the tensioner 10 and serves to align the pivot arm 14 during use. Using an armplate and plate bushing to provide an axial clamping force is described in greater detail in U.S. Pat. No. 6,206,797, the details of which are incorporated by reference as if fully set forth herein.

As noted above, referring now to FIGS. 1 and 1A, the height H (e.g., greater than 41 mm, such as about 42.2 mm) of the spring cavity 16 is greater than the unloaded height h (e.g., less than about 42.2 mm, such as about 41 mm) of the round wire spring 18. As a result, no axial force is transmitted to the round wire spring 18 due to the axial compression force applied by the armplate 82, nor does the axial compression force have to overcome any axial spring force applied by the spring to bias the assembly together. As such, the round wire spring 18 is effectively isolated from the axial compression force applied by the armplate 82. Also, in some embodiments, because H of the spring cavity 16 is greater than h of the round wire spring 18, an axial compression force need not be applied to maintain the pivot arm's spring biased, unloaded position as there is no axial spring force applied to the pivot arm that would cause the pivot arm to disengage the support housing 12. Further, use of a round wire spring 18 can, in some cases, provide packaging benefits, such as in cases where it is difficult to package a flat wire spring.

A number of detailed embodiments have been described. Nevertheless, it will be understood that various modifications may be made. For example, while an armplate and plate bushing clamping arrangement has been described other suitable compression devices may be used, such as a Belleville or wave spring. Accordingly, other embodiments are within the scope of the following claims.

What is claimed is:

1. A tensioner for tensioning a belt, the tensioner comprising:
a support housing that defines, at least in part, a spring cavity;
an arm pivotably attached to the support housing;
a torsion spring disposed in the spring cavity and operatively connected to the arm and support housing; wherein the torsion spring biases the arm to pivot relative to the support housing; and
a deflectable armplate seated on the arm and deflected into engagement with the support housing; wherein engagement of the armplate and support housing provides an axial force that clamps the arm and the support housing together;
wherein the torsion spring is a round wire coil spring having an unloaded axial height and wherein the spring cavity has a height greater than the unloaded axial height of the torsion spring such that the axial force applied by the armplate to clamp the arm and the support housing together is not transmitted to the torsion spring.

2. The tensioner of claim 1, wherein the arm, when pivotably attached to the support housing, defines, at least in part, the spring cavity.

3. The tensioner of claim 1 further comprising a spring bushing disposed between the support housing and the pivot arm.

4. The tensioner of claim 3, wherein the spring bushing includes a flanged outer rim that extends over an outer surface of at least one of the pivot arm and support housing.

5. The tensioner of claim 4, wherein the flanged outer rim of the spring bushing extends over the outer surface of both the pivot arm and the support housing.

6. The tensioner of claim 4, wherein the spring bushing forms a seal between the pivot arm and the support housing.

7. The tensioner of claim 4, wherein the spring bushing has a lower surface in contact with an upper end surface of the support housing, the contact being continuous along the lower surface of the spring bushing.

8. The tensioner of claim 1, wherein the torsion spring is not axially compressed when disposed in the spring cavity.

9. The tensioner of claim 2, wherein the torsion spring applies no axial force to the arm when the torsion spring is disposed in the spring cavity and the arm is pivotably attached to the support housing.

10. The tensioner of claim 2, wherein the arm is pivotably attached to the support housing without axially compressing the torsion spring.

11. The tensioner of claim 1 further comprising a plate bushing positioned between the deflectable armplate and the arm; the support housing further comprising an alignment member extending from the spring cavity through the arm; wherein the plate bushing is shaped to define a gap between an inner surface thereof and the alignment member and the deflectable armplate is elastically deflected into the gap to connect the deflectable armplate to the alignment member thereby clamping the arm to the support housing.

12. The tensioner of claim 11 wherein the deflectable armplate has a splined connection to the alignment member.

13. The tensioner of claim 11 wherein the plate bushing is radially riveted into the gap.

14. A tensioner for tensioning a belt, the tensioner comprising:
a support housing;
an arm pivotably attached to the support housing;
a deflectable compression member seated on the arm and deflected into engagement with the support housing, wherein engagement of the armplate and the support housing provides an axial force that clamps the arm and the support housing together; and
a round wire, torsion spring operatively connected to the support housing and the arm; wherein the round wire, torsion spring biases the arm to pivot relative to the support housing;
wherein the round wire, torsion spring is disposed within the support housing such that the axial force exerted by the deflectable compression member is not exerted on the round wire, torsion spring.

15. The tensioner of claim 14, wherein the deflectable compression member comprises spring steel.

16. The tensioner of claim 14, wherein the deflectable compression member comprises a Belleville spring or a wave spring.

17. The tensioner of claim 14, wherein the round wire, torsion spring is located between the pivot arm and the support housing.

18. The tensioner of claim 17, wherein the round wire, torsion spring is disposed in a spring cavity formed by the support housing.

19. The tensioner of claim 14, further comprising a spring bushing disposed between the support housing and the pivot arm.

20. The tensioner of claim 19, wherein the spring bushing includes a flanged outer rim that extends over an outer surface of at least one of the pivot arm and support housing.

21. The tensioner of claim 20, wherein the flanged outer rim of the spring bushing extends over the outer surface of both the pivot arm and the support housing.

22. The tensioner of claim 20, wherein the spring bushing forms a seal between the pivot arm and the support housing.

23. The tensioner of claim 20, wherein the spring bushing has a lower surface in contact with an upper end surface of the support housing, the contact being continuous along the lower surface of the spring bushing.

24. The tensioner of claim 14 further comprising a plate bushing positioned between the deflectable armplate and the arm; the support housing further comprising an alignment member extending from the spring cavity through the arm; wherein the plate bushing is shaped to define a gap between an inner surface thereof and the alignment member and the deflectable armplate is elastically deflected into the gap to connect the deflectable armplate to the alignment member thereby clamping the arm to the support housing.

25. The tensioner of claim 24 wherein the deflectable armplate has a splined connection to the alignment member.

26. The tensioner of claim 24 wherein the plate bushing is radially riveted into the gap.

27. A method of assembling a belt tensioner comprising a support housing and an arm pivotably attached to the support housing, the method comprising the steps of:
coupling the support housing and the arm together through a round wire, torsion spring;
biasing the arm and support housing together using a deflectable compression member seated on the arm and deflected into engagement with the support housing, wherein engagement of the deflectable compression member and the support housing provides an axial compressive force that biases the arm and support housing together; and
locating the round wire, torsion spring within the support housing so as to isolate the round wire, torsion spring from the axial compressive force exerted by the deflectable compression member;
wherein the round wire, torsion spring biases the arm to pivot relative to the support housing.

28. The method of claim 27 further comprising connecting a first end of the round wire, torsion spring to the pivot arm and connecting a second end of the round wire, torsion spring to the support housing.

29. The method of claim 28 further comprising loading the round wire, torsion spring by rotating the pivot arm in a loading direction relative to the support housing.

30. The method of claim 29 further comprising stopping rotation of the pivot arm relative to the support housing with the pivot arm in the unloaded position.

31. The method of claim 27 further comprising positioning a spring bushing between the pivot arm and the support housing.

32. The method of claim 31 further comprising providing continuous contact between contact surfaces of the spring bushing and support housing.

33. The method of claim 27, wherein the step of compressing includes elastically deflecting an arm plate toward an upper surface of the pivot arm.

34. The method of claim 27 further comprising positioning the round wire, torsion spring in a spring cavity formed between the pivot arm and the support housing.

35. The method of claim 34, wherein the spring cavity has a height greater than an unloaded height of the round wire, torsion spring.

36. The method of claim 27 further comprising mounting the support housing to an automobile.

* * * * *